United States Patent [19]

Swanson et al.

[11] Patent Number: 5,618,633
[45] Date of Patent: Apr. 8, 1997

[54] HONEYCOMB CASTING

[75] Inventors: Roger A. Swanson, Gladstone; Terry M. Nelson, West Linn; James R. Barrett, Milwaukie; Laxmappa Hosamani, Beaverton, all of Oreg.

[73] Assignee: Precision Castparts Corporation, Portland, Oreg.

[21] Appl. No.: 274,171

[22] Filed: Jul. 12, 1994

[51] Int. Cl.⁶ .................... B32B 3/12; E04C 2/30
[52] U.S. Cl. ........................ 428/593; 52/793.1
[58] Field of Search ................ 428/593, 923; 52/793.1, 784.14

[56] References Cited

U.S. PATENT DOCUMENTS

| | | | |
|---|---|---|---|
| 2,246,578 | 6/1941 | Salardi | 428/593 |
| 2,609,068 | 9/1952 | Pajak | 189/34 |
| 2,644,777 | 7/1953 | Havens | 154/45.9 |
| 2,716,791 | 9/1955 | Schellens | 22/200 |
| 2,878,538 | 3/1959 | Theis | 22/139 |
| 3,068,016 | 12/1962 | Dega | 277/96 |
| 3,391,038 | 7/1968 | Whitesides | 156/78 |
| 3,512,571 | 5/1970 | Phelps | 164/37 |
| 3,716,347 | 2/1973 | Bergstrom et al. | 29/182.2 |
| 3,831,710 | 8/1974 | Wirt | 181/336 |
| 3,844,011 | 10/1974 | Davies | 29/182.3 |
| 4,027,058 | 5/1977 | Wootten | 428/36 |
| 4,035,536 | 7/1977 | Morrison | 428/118 |
| 4,235,303 | 11/1980 | Dhoore et al. | 181/214 |
| 4,265,955 | 5/1981 | Harp et al. | 428/116 |
| 4,291,080 | 9/1981 | Ely et al. | 428/116 |
| 4,293,513 | 10/1981 | Langley et al. | 264/60 |
| 4,336,292 | 6/1982 | Blair | 428/116 |
| 4,461,796 | 7/1984 | Fukahori et al. | 428/116 |
| 4,471,028 | 9/1984 | Kimura et al. | 428/593 |
| 4,541,967 | 9/1985 | Masaki | 261/95 |
| 4,575,330 | 3/1986 | Hull | 425/174.4 |
| 4,591,534 | 5/1986 | Wagner et al. | 428/593 |
| 4,639,388 | 1/1987 | Ainsworth et al. | 428/117 |
| 4,672,940 | 6/1987 | Nakayama et al. | 123/590 |
| 4,689,081 | 8/1987 | Watts | 106/38.4 |
| 4,807,411 | 2/1989 | Capaul | 52/144 |
| 4,873,810 | 10/1989 | Lecaroz | 52/793.1 |
| 4,934,580 | 6/1990 | Sutton | 228/157 |
| 4,965,138 | 10/1990 | Gonzalez | 428/593 |
| 4,999,745 | 3/1991 | Shimatani | 361/429 |
| 5,024,369 | 6/1991 | Froes et al. | 228/157 |
| 5,116,689 | 5/1992 | Castro et al. | 428/593 |
| 5,174,931 | 12/1992 | Almquist et al. | 264/22 |
| 5,192,623 | 3/1993 | Gewelber | 428/593 |
| 5,256,340 | 10/1993 | Allison et al. | 264/22 |
| 5,262,220 | 11/1993 | Spriggs | 428/593 |
| 5,273,806 | 12/1993 | Lockshaw et al. | 52/793.1 |
| 5,280,819 | 1/1994 | Newkirk et al. | 164/98 |

FOREIGN PATENT DOCUMENTS 2214842  9/1989  United Kingdom ......... 428/593

*Primary Examiner*—John Zimmerman
*Attorney, Agent, or Firm*—Klarquist Sparkman Campbell Leigh & Whinston, LLP

[57] ABSTRACT

A metal article, at least a portion of which has a honeycomb structure, is described. The article was produced by an investment casting process. The metal casting comprises a base and plural walls which form a honeycomb structure that project outwardly in a first direction from at least a portion of the base. The base typically has a thickness of about 5 mm or less. The honeycomb structure may be defined by plural cells having geometric shapes. For instance, plural interconnected regular polygons, such as plural interconnected pentagons or hexagons, plural irregular interconnected polygons, or plural regular and irregular interconnected polygons may be used. The maximum distance between any two points on the periphery of the cell and passing through the interior space defined by the geometric shape is about 40 mm. The walls of the casting may have a wall thickness of from about 0.3 mm to about 3.2 mm thick. The method for forming the metal casting comprises first forming a pattern having a base, preferably with a thickness of 5 mm or less, and plural walls that extend upwardly from the base and define a honeycomb structure. A mold is formed around the pattern by surrounding the pattern with a refractory material. The pattern is then removed to form a void within the mold in the shape of the pattern. The void is then filled with a molten metal composition. The metal composition is allowed to solidify in the shape of the desired article, and the mold is then removed.

12 Claims, 2 Drawing Sheets

HONEYCOMB CASTING

FIELD OF THE INVENTION

This invention concerns metal castings, at least a portion of which include a honeycomb structure.

BACKGROUND OF THE INVENTION

The present invention is directed to metal castings that include honeycomb structures. A honeycomb structure consists of a series of interconnected polygons. The honeycomb structure decreases the amount of metal alloy used to form the casting, and thereby reduces the weight of the casting. However, the decrease in the amount of material used does not unduly sacrifice the overall strength of the casting.

International Patent Application No. PCT/FI9190/00157 concerns an aluminum door. The door is die-cast so that a honeycomb structure is situated between a bottom plate and a top plate. The average size of the diagonal of the spaces defining the honeycomb structure is 70 mm to about 150 mm. UK Patent Application No. GB 2 221 638 A also describes a structural component having a honeycomb structure. A model is produced that includes plural layers separated by spaces. The model is embedded in sand, and then molten metal is cast using the model. The metal casting has a honeycomb structure, but does not include a base plate or a top plate.

The processes that have been used to make honeycomb castings are limited in the structures that they can produce. The method described in International Application, PCT/FI9190/00157, forms composites having both a base plate and a top plate. It currently is believed that it would be difficult, if not impossible, to form a honeycomb structure using this method wherein the honeycomb is open opposite a relatively thin base plate, such as less than about 5 mm thick. The process also could not form a honeycomb structure wherein the dimensions of the cells are small (such as less than about 40 mm) relative to the cells of the door. One reason for this is that it becomes increasingly difficult to pour the molten metal into the die and have the metal flow evenly through the die as the dimensions of the die decrease. Furthermore, it currently is believed that the method described in UK Patent Application No. GB 2 221 638 A cannot produce metal castings if any of the dimensions of the cells defining the honeycomb structure are smaller than about 5 mm (about 0.150 inch).

A need therefore exists for metal castings that include honeycomb structures which cannot be produced by previous prior-art processes. One example of such a casting is a honeycomb structure having relatively small cell dimensions, such as dimensions smaller than about 40 mm. A second example of such a casting is a honeycomb structure that is integrally cast with a base having a thickness of less than about 5 mm.

SUMMARY OF THE INVENTION

The present invention concerns metal castings, at least a portion of which have a honeycomb structure. In general, the metal casting comprises a base and plural walls of substantially uniform thickness. The plural walls form a honeycomb structure and project outwardly in a first direction from at least a portion of the base, which generally has a thickness of less than about 5 mm. The honeycomb structure is open (i.e., does not include a second plate) opposite to the base.

The honeycomb structure is defined by plural regular interconnected geometric shapes, typically closed geometric shapes. For instance, the honeycomb structure may comprise polygons, such as plural interconnected pentagons or hexagons, or plural interconnected irregular polygons. The maximum cross-sectional distance between opposed walls of the regular polygons and extending between the centers of the polygons is about 40 mm. The distance between opposed walls of each hexagonal cell, taken along a line bisecting the opposed walls of the cell and intersecting the center of the cell, generally is from about 5 mm to about 40 mm. This distance preferably is from about 5 mm to about 20 mm. The wall thickness of the metal casting may be from about 0.3 mm to about 3.2 mm thick, and preferably is from about 0.7 mm to about 2.0 mm thick.

The metal casting also can be a monolithic casting of metal comprising plural walls having a uniform thickness. The wall are interconnected to form a cellular structure including a multiplicity of cells which are open at their respective ends. A plurality of the cells generally have a regular geometric shape, including polygonal shapes, such as pentagons or hexagons.

A particular embodiment of the present invention provides a metal casting comprising plural walls and a base having a thickness of 5 mm or less. The plural walls generally have a substantially uniform wall thickness, and project outwardly from a first major surface of the base greater than about 1 mm, and generally less than about 20 mm. The walls are interconnected to form a cellular structure which includes a multiplicity of cells of a regular or irregular polygonal shape. The maximum distance between any of the walls of a cell, or the intersection of two walls and a third wall, is from about 5 mm to about 40 mm, preferably from about 5 mm to about 20 mm. The thickness of the cell walls is from about 0.3 mm to about 3.2 mm thick, preferably from about 0.8 mm to about 2.0

A method also is provided for forming a metal article by investment casting. The method comprises first forming a pattern that has a honeycomb structure. The pattern can be formed by stereolithiography. The pattern also can be made from traditional pattern materials known to those skilled in the art, such as, but not limited to: wax, plastic, preformed ceramic cores and foam. In addition, non-traditional pattern materials can be used, such as materials used for stereolithiography and other rapid prototyping methods known to those skilled in the art. The pattern has a relatively thin base, which preferably has a thickness of 4 mm or less. The pattern includes plural walls that define a honeycomb structure. The honeycomb structure has a first surface and a second surface. The first surface of the honeycomb structure is connected to a first major surface of the base. The second surface of the honeycomb structure has an open face and projects outwardly in a first direction from at least a portion of the base.

A mold is formed around the pattern by surrounding the pattern with a refractory material. The step of surrounding the pattern generally involves repeatedly immersing the pattern in a slurry of a refractory material. The refractory material is hardened around the pattern, such as by firing. The pattern is then removed to form a void within the mold in the shape of the pattern. The void is then filled with a molten metal composition. Although the method may be used to cast metal articles of virtually any metal composition, the metal composition generally is selected from the group consisting of aluminum, aluminum-based alloys, iron, iron-based alloys, nickel, nickel-based alloys, titanium, titanium-based alloys, cobalt, cobalt-based alloys and any other alloys that are classified by those skilled in the art as superalloys. The metal composition is allowed to solidify in the shape of the desired article, and the mold is removed. The plural walls of the casting are interconnected to form a cellular honeycomb structure which includes plural interconnected polygonal cells. The method also may involve forming a pattern having plural walls that project outwardly from the base and which are interconnected to form a cellular structure, and which define a recess at the end of the cells opposite to the first surface for receiving a cover plate to close such end of the cells.

Accordingly, a first object of the present invention is to provide metal articles which are cast by an investment casting process so that at least a portion of the casting has a honeycomb structure.

Another object of the present invention is to provide an integral honeycomb metal casting having a relatively thin base having a thickness of about 5 mm or less.

Another object of the present invention is to provide a metal casting having a honeycomb structure that includes plural, interconnected geometric shapes, including regular and/or plural irregular interconnected polygons.

Another object of the present invention is to provide a metal casting having a honeycomb structure that includes plural, interconnected regular and/or plural irregular interconnected polygons wherein the maximum cross-sectional distance between any of the opposed walls of the polygons, or the intersection of two walls and a third wall, is less than about 40 mm.

Another object of the present invention is to provide a metal casting produced by investment casting wherein the walls of the casting are relatively thin, having a thickness of from about 0.3 mm to less than about 3.2 mm.

Another object of the present invention is to provide a monolithic metal casting having plural walls that are interconnected to form a honeycomb structure wherein the casting also defines a recess for receiving a cover plate.

An advantage of the present invention is that the cast metal articles include a honeycomb structure wherein the maximum cross-sectional distance between opposed walls of the polygons forming the honeycomb structure, or between the intersection of two walls and a third wall, is less than about 40 mm.

Another advantage of the present invention is that it provides metal castings having cell dimensions which are smaller than can be produced by prior-art processes.

DETAILED DESCRIPTION OF THE PREFERRED EMBODIMENTS

I. Metal Articles

Metal articles formed by investment casting according to the present invention, at least a portion of which have a honeycomb structure, are illustrated in FIGS. 1–4. These metal castings are produced using an investment casting process. It should be understood that the present invention can be used to cast many different articles, and is not limited to the articles illustrated in FIGS. 1–4. The investment casting of metal articles and the temperature controlled solidification of castings, is described in U.S. Pat. Nos. 5,407,001 and 5,577,547, which are owned by the assignee of the present invention. These patent applications are incorporated herein by reference.

A. Honeycomb Structure

Figure 1:
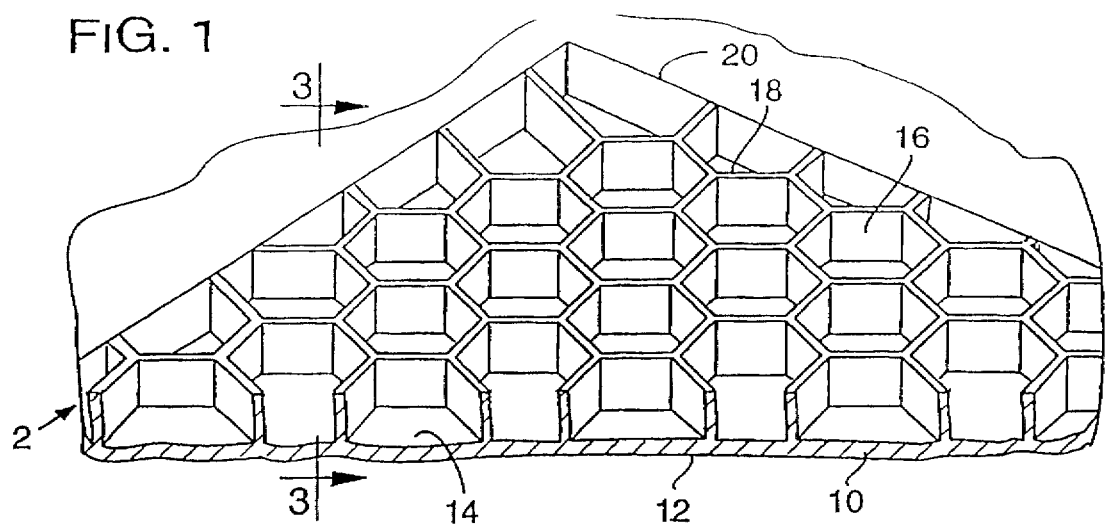
FIG. 1 is a side elevational view of a metal casting having a base and a honeycomb structure extending therefrom.
Figure 2:
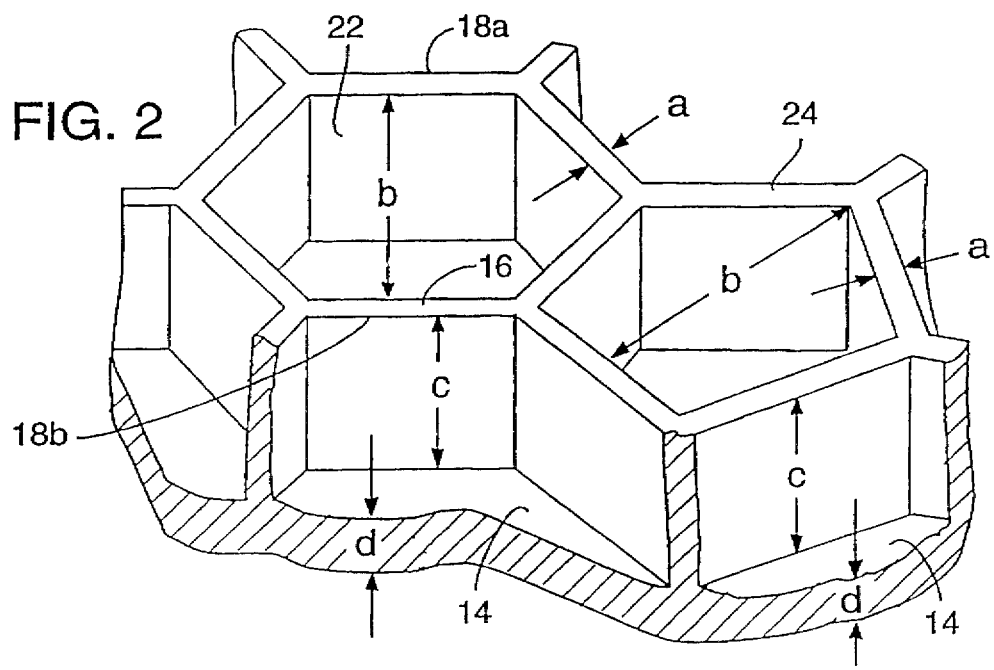
FIG. 2 is a side elevational view of a metal casting at illustrates certain important dimensions of the honeycomb cells.

As used herein, "honeycomb" refers to a plural, interconnected polygonal cells that project upwardly from a base as shown in FIG. 1. The polygon may be any of a number of shapes, including, without limitation, triangles, squares, pentagons, hexagons, heptagons, octagons, nonagons, decagons, and even circles. A particular embodiment of the present invention utilizes a honeycomb structure comprised of plural interconnected regular polygons, such as pentagons or hexagons, as illustrated in FIG. 1. The honeycomb structure also may be formed by plural interconnected irregular polygons, or plural interconnected regular and irregular polygons, which also is illustrated in FIG. 1. "Regular" refers to a polygon wherein (1) the angles defined by the intersecting sides are substantially equal, and (2) the lengths of each side of the polygon are substantially equal. An "irregular polygon" refers to a polygon having angles that are not equal, and/or wherein the lengths of the sides of the polygon are not equal. The honeycomb structure also may be formed by interconnecting two or more polygons having different shapes, such as a structure that includes hexagons connected to pentagons, as illustrated in FIG. 2. Thus, "honeycomb" refers to plural, interconnected regular and/or irregular polygons that extend upwardly from a base. Without limitation, a preferred polygon for the present invention is a hexagon, so that the honeycomb structure is defined by plural interconnected hexagons.

B. Illustrated Metal Casting

FIG. 1 illustrates a cast metal article 2 having base 10. Base 10 has two major opposed surfaces, bottom surface 12 and upper surface 14. FIG. 1 illustrates a honeycomb structure consisting of plural, interconnected hexagonal cells 16. Cells 16 are formed by plural walls 18. FIG. 1 shows that the walls 18 extend upwardly from the upper surface 14 of base 10 to form the honeycomb structure. Base 10 and cells 16 are integrally formed by an investment casting process.

FIG. 1 also illustrates that the cells 16 need not be of a uniform shape throughout the entire region that defines the honeycomb structure. For instance, FIG. 1 shows that as the cells 16 approach edge 20 of the article 2, they tend to adopt an irregular shape, as compared to the regular shape of the illustrated hexagonal cells 16. This change in the shape of the cells 16 may or may not be used to form the honeycomb structure, and generally depends on the nature of the metal article being cast.

C. Cell Dimensions

Metal articles with honeycomb structures have been cast by methods other than investment casting, such as by die casting as discussed in the Background of the Invention. However, previous methods produce castings having relatively large cells 16. For instance, die casting methods have been used to produce doors wherein the cross-section of the cells is no smaller than about 70 mm. However, many devices must satisfy structural criteria that are much more stringent than would be expected for doors. Many such metal articles would benefit from having cell sizes which are much smaller than about 70 mm, as long as the strength of the article is not unduly compromised.

FIG. 2 illustrates certain important dimensions of cells 16 that are labelled a, b, c and d for convenience. It is quite difficult, if not impossible, to cast honeycomb structures by die-casting methods, or by the prior-art lost-foam casting, where any of the dimensions a, b, c or d is less than about 5 mm (about 0.150 inch).

Dimension a refers to the wall thickness of the cells 16. The present invention is particularly directed to metal castings wherein dimension a is from about 0.4 mm to about 5 mm (from about 0.015 inch to about 0.15 inch), preferably from about 0.4 mm to about 3 mm (from about 0.015 inch to about 0.125 inch), and even more preferably from about 0.4 mm to about 2 mm (from about 0.015 inch to about 0.08 inch).

Dimension b refers in general to the maximum distance between any two points on the walls 18 that define the cells 16. More specifically, dimension b refers to the distance between opposed walls and through the center of the polygon when the polygon is a regular polygon. FIG. 2 illustrates dimension b with respect to a regular hexagon. For this case, dimension b refers to the distance between opposed walls 18a and 18b of each cell 16, taken along a line bisecting the opposed walls of the cell and intersecting the center of the cell.

However, it will be apparent that this measurement applies only to regular polygons of even number of sides, such as squares, hexagons and octagons, and circles (i.e. the diameter of the circle). When the polygon is irregular, or if the polygon is a regular polygon having an odd number of sides, then the dimension b does not refer to the distance between opposed walls 18 of each cell 16, taken along a line bisecting the opposed walls of the cell and intersecting the center of the cell. Rather, in such cases dimension b refers to the maximum distance between any two points on the periphery of walls 18 that define cells 16 and wherein a line connecting the points passes through the interior space 22 as defined by the polygon. This generally refers to the distance between either (1) two opposed walls, or (2) the juncture of two sides and an opposed wall. This later situation is illustrated for a pentagon in FIG. 2.

The present invention is particularly directed to metal castings wherein dimension b is from about 3 mm to about 38 mm (from about 0.15 inch to about 1.5 inches), preferably from about 3 mm to about 25 mm (from about 0.15 inch to about 1 inch), and even more preferably from about 6 mm to about 20 mm (from about 0.25 inch to about 0.75 inch).

Dimension c refers to the height of cell wall 18, which is the distance from the upper surface 14 of base 10, to the upper surface 24, which is defined by cells 16. For the present invention, dimension c preferably is from about 1 mm to about 20 mm (from about 0.05 inch to about 0.75 inch), preferably from about 1 mm to about 15 mm (from about 0.015 inch to about 0.6 inch), and even more preferably from about 3 mm to about 13 mm (from about 0.1 inch to about 0.5 inch).

Dimension d refers to the thickness of base plate 10 of article 2. Base plate 10 and cells 16 are integrally cast by an investment casting process. The thickness of the base plate 10 is an important consideration for this casting process. For methods other than investment casting, such as die-casting methods, it is virtually impossible to produce metal castings having an integral base wherein the thickness of the base is less than about 0.125 inch. The present invention provides such metal castings. For the present invention, dimension d is from about 0.4 mm to about 4 mm (from about 0.015 inch to about 0.15 inch), preferably from about 0.4 mm to about 2.5 mm (from about 0.015 inch to about 0.1 inch), and even more preferably from about 1 mm to about 2 mm (from about 0.03 inch to about 0.08 inch).

D. Metal-Alloy Compositions

Metal castings according to the present invention often are subject to relatively severe operating conditions. As a result, such parts are made from metal compositions selected to withstand such functions. Although the present invention is useful for casting virtually any metal composition, is particularly useful for metals or metal compositions selected from the group consisting of aluminum, aluminum-based alloys, iron, iron-based alloys, nickel, nickel-based alloys, titanium, titanium-based alloys, cobalt, cobalt-based alloys, nickel-chromium superalloys, cobalt-chromium superalloys, iron-chromium superalloys, and any other metal composition generally considered to be a superalloy by those skilled in the art. A superalloy is an alloy that can withstand relatively high temperatures, such as greater than about 600° F., and typically greater than about 1,000° F. The metal composition is even more particularly selected from the group consisting of cobalt-chromium superalloys and iron-chromium superalloys.

Specific examples of alloys useful for practicing the present invention are provided in the following lists. These alloys are commercially available from such companies as Certified Alloys.

The Ni-based alloys include, without limitation: (1) 718 (53 percent Ni, 19 percent Cr, 18 percent Fe, 5 percent Cb and 3 percent Mo); (2) 713C (74 percent Ni, 12.5 percent Cr, and 0.0 percent Co); (3) 713LC (75 percent Ni, 12.0 percent Cr, and 0.0 Co); (4) B-1900, which has a melt range of about 2,325° F. to about 2,375° F., (60 weight percent Ni, 8 percent Cr, and 10 percent Co); (5) C-1023 (58 percent Ni, 15.5 percent Cr, 10.0 percent Co); (6) IN-738LC, which has a melt range of from about 2,250 to about 2,400° F. (61 percent Ni, 16 percent Cr, 8.5 percent Co); (7) IN-939 (48 percent Ni, 22.5 percent Cr, 9.0 percent Co); (8) Rene 77 (58 percent Ni, 14.0 Cr, and 15 percent Co); and (9) Rene 41, which has a solidus temperature of about 2,400° F. and a liquidus temperature of about 2,500° F. (55 percent nickel, 11 percent cobalt, 19 percent chromium and 10 percent Mo).

The cobalt-based alloys include, without limitation: (1) FSX-414 (10 percent Ni, 29 percent Cr, and 52 percent Co); and (2) MAR-M-509 (10 percent Ni, 23.5 percent Cr, and 55 percent cobalt).

The preceding lists should not be seen as limiting the present invention to the particular compositions described. The purpose is to provide a non-exhaustive list of alloy compositions that have been used to practice this invention. One skilled in the art can determine, amongst other pertinent information, the composition for each alloy by consulting such books as "Superalloys," edited by Chester Simms, and published by John Wiley & Sons (1987).

II. Casting the Metal Article

A. Forming the Pattern

Casting 2 is cast with an equiaxed grain structure. A first step in producing metal casting 2 by investment casting comprises forming a pattern having the desired shape. For the present invention, patterns have been made by stereolithiography, which is a process known in the art. Stereolithiography is described in several U.S. patents, including U.S. Pat. Nos. 4,575,330, 5,174,931 and 5,256,340, each of which is incorporated herein by reference. Stereolithiography is a three-dimensional printing process that produces a solid plastic model. The process involves automating a laser beam to draw or print a section of the pattern onto the surface of a photo-curable liquid plastic. For the present invention, a stereolithiography apparatus produced by 3D Systems, Inc. was used.

B. Forming the Mold

The pattern produced by stereolithiography is used as a template to form a mold. This is accomplished by surrounding the pattern with a refractory material. Generally, the process involves repetitively dipping the pattern in a slurry of ceramic mold material. There are a number of slurries that are potentially useful for forming the mold, including yttria-based slurries as described in U.S. patent application, Serial No. 08/089,259, which is incorporated herein by reference. However, mullite-based slurries are preferred slurries suitable for the present invention.

The mold-forming process also involves stuccoing the layers to build up a mold material over the pattern assembly. Any refractory stucco can be used, such as alumina, silica and zirconia. The various refractory layers and stucco collectively define the mold. The mold is dried once a desired thickness has been built up over the pattern.

The pattern is then removed from the ceramic layer using a deplasticizing process. This involves heating the pattern and mold to a temperature above the decomposition temperature of the resinous polymeric material used to form the pattern. The ceramic mold material is then fired to give it the requisite strength and to complete the process of forming the mold structure.

C. Casting The Article

Figure 5:
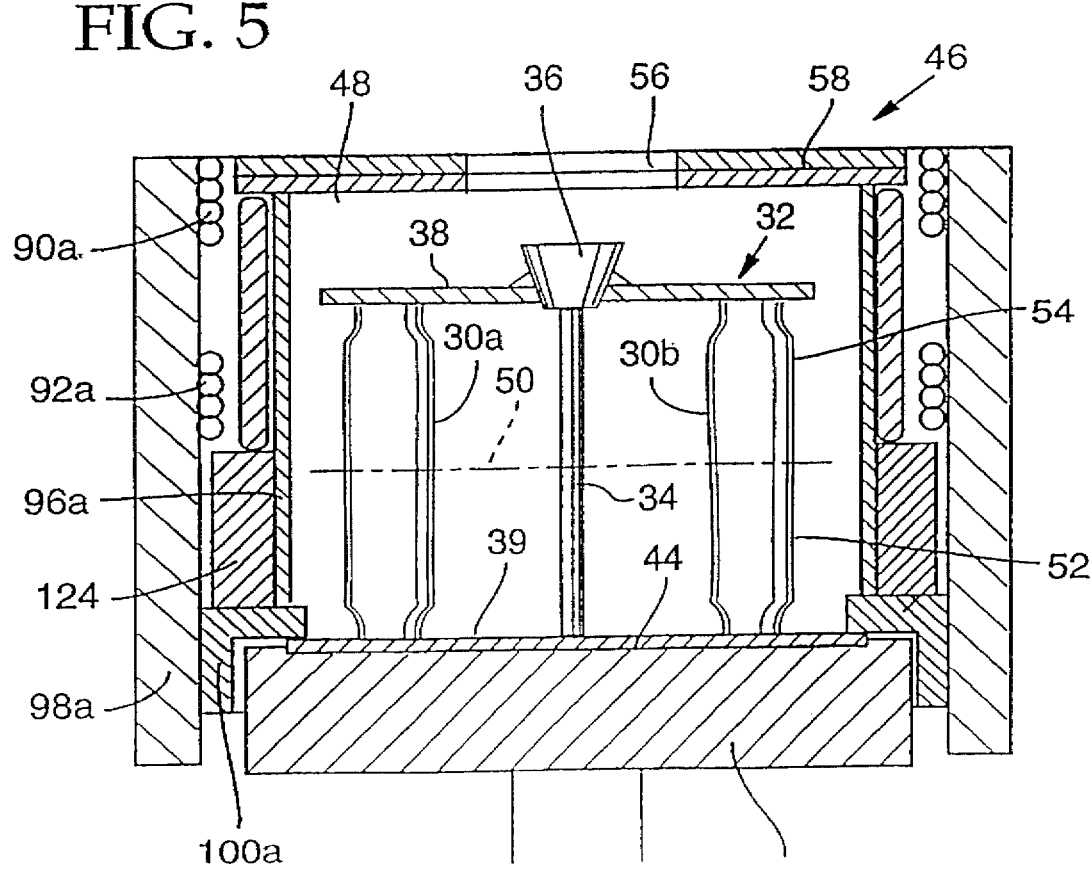
FIG. 5 is a schematic view of a mold structure and casting device used to cast the metal articles according to the present invention.

An article mold 30 as shown in FIG. 5, formed to have a base and a honeycomb structure, having only a single inlet at its upper end was used to cast the honeycomb articles 2. Generally, it is preferred that there be no gates along the sides of the article mold 30. However, it is contemplated that a blind riser or a gate could be provided if desired. The casting process was conducted in such a manner as to result in articles 2 having a fine equiaxed grain structure. Articles 2 were free of shrinkage defects, hot tears and distortion as shown by X-ray analysis.

For reasons of economy, it is preferred to cast a plurality of articles at a time using a one-piece mold structure 32. It should be understood that although only two article molds 30a, 30b are shown in FIG. 5, the mold structure 32 may have eight, twelve, sixteen, twenty or more article molds 30 disposed in an annular array or cluster about a solid support post 34.

A pour cup 36 is supported on an upper end of the support post 34. A plurality of gates or runners 38 may extend outwardly from the pour cup 36 with one runner going to each article mold 30. The article molds 30 are supported on a circular base plate 39 by ceramic spacer blocks (not shown). The spacer blocks support the closed lower end portions of the article molds 30. The spacer blocks could be eliminated or could have different dimensions if desired.

The mold structure 32 is placed on a circular water-cooled copper chill plate 42. Although the closed lower ends of the article molds 30 are close to the chill plate 42, they are separated from the chill plate 42 by about three eighths to one and one half inches of ceramic material. The longitudinal central axes of article mold cavities in the article molds 30 are perpendicular to a horizontal upper side surface 44 of the chill plate 42.

A motor (not shown) then moves a cylindrical support post 45 for the chill plate 42 vertically upwardly. As the chill plate 42 moves upwardly, the mold structure 32 enters a chamber or housing (not shown) which encloses a furnace 46. Continued upward movement of the chill plate 42 moves the mold structure 32 into a cylindrical furnace chamber 48. The housing enclosing the furnace 46 is then evacuated and the mold structure 32 is preheated.

The furnace 46 preheats the mold structure 32 in a nonuniform manner. Thus, there is a temperature gradient which increases from a low temperature at the lower end of the article molds 30 to a higher temperature at the upper ends of the molds 30. An imaginary horizontal plane 50 extends through the centers of the molds 30 and divides them into a lower half 52 and an upper half 54.

The lower half 52 of the article molds 30 is heated into a first temperature range. The highest temperature in this first temperature range is close to but is less than the solidus temperature of the metal of article 2. The upper half 54 of the article molds 30 is heated into a second temperature range in which the temperatures are higher than the temperatures in the first temperature range. Since the upper and lower halves 52 and 54 of the article molds 30 are separated by only an imaginary plane 50, the lowest temperature in the second temperature range into which the upper half 54 is heated is the same as the highest temperature of the temperature range into which the lower half 52 is heated.

Preheating the lower half 52 to a temperature which is less than the temperature of upper half 54 is facilitated by having the mold structure 32 supported by the chill plate 42. A typical furnace which is used to cast metal articles having a honeycomb structure includes plural heating elements, although one continuous helical heating element also will work. When plural heating coils are used, the amount of electrical energy which is conducted to such coils may result in a differential in the heat energy transmitted to the article molds 30. The heating coils generally are surrounded by a cylindrical furnace wall. An annular ceramic ring is disposed adjacent to the lower end of the furnace wall. The susceptor is seated on and supported by the ceramic ring. Of course, a casting device having a construction which is different than the specific construction described herein also will work to cast the metal articles.

Once the article molds 30 are preheated in the furnace 46, molten metal is poured through an opening 56 in a circular upper end wall 58 of the furnace 46 into the pour cup 36. At the time of pouring, the molten metal typically is superheated. As used herein, the term "superheated" refers to heating the alloy to a temperature which is higher than the liquidus temperature of the metal composition by from about 50° F. to about 400° F. The pouring of the molten metal occurs in the vacuum chamber or housing which surrounds the furnace 46. Although it is preferred to fill the article mold cavity from only a single runner or gate 38 which is connected in fluid communication with the upper end of the article mold cavity, a second runner or gate 38 could be connected with the lower end of the article mold cavity if desired.

Random nucleation occurs over almost the entire surface of each article mold cavity when the molten metal is poured into the article molds. Although the exact extent of nucleation on the surfaces of the article mold cavities is not known, it is believed that nucleation and, therefore, initiation of solidification of the molten metal, occurs at locations which are disposed along thin portions of each article mold cavity. Nucleation may be promoted by the presence of an inoculant in the molten metal.

As soon as the article molds 30 are filled with molten metal, the withdrawal of the furnace 46 from around the mold structure 32 (or vice versa) begins. The rate of withdrawal of the furnace 46 from around the mold structure 32 may vary. It has been found that withdrawal rates as low as about 0.10 inch per minute to 0.50 inch per minute (about 7.0 inches per hour to about 30 inches per hour) provide suitable solidification results, as determined by radiographic analysis of the cast metal article. A preferred furnace withdrawal rate is about 0.25 inch per minute.

After the furnace 46 has been completely withdrawn from around mold structure 32, the cooling of the mold structure 32 and the metal therein is completed. The ceramic material of the mold is thereafter removed from the solidified metal. The metal which solidified in the article molds 30 will have an equiaxed grain structure and an overall configuration which corresponds to the configuration of articles 2.

The present invention will be illustrated by the following example, which is provided for purposes of illustrating specific embodiments of the invention, and should not be considered in any way to limit the invention to the specific features described herein.

EXAMPLE 1

This example describes the formation of a metal casting, such as those shown in FIGS. 1–4. A pattern having hexagonal cells as shown in FIG. 1 was produced by stereolithiography. The pattern was then repeatedly immersed in a mullite slurry and stuccoed as described above. The pattern was then removed by heating to form a mold cavity for receiving a molten metal alloy designated 718. 718 has an approximate solidus temperature of about 2,350° F., an approximate liquidus temperature of about 2,450° F., and is a nickel-based superalloy having the following composition: Ni=52%; Cr=19%; Fe=18%; Mo=3%; Cb=5%; Al=0.5%; and Ti=1%. The 718 metal alloy was heated to a pour temperature of about 2,750° F.

The mold structure 32 was preheated in a furnace, such as illustrated by furnace 46, so that the mold temperature at the top of the mold was about 2,450° F. For the present example, an inoculant was used to promote nucleation. The molten metal ran through the runners 38 and into the mold cavities. As soon as the article mold cavities 38 were filled with molten 718 metal, the furnace was withdrawn from round the mold at a withdrawal rate of about 0.25 inch per minute (15 inches per hour). This withdrawal rate was maintained for a period of greater than 40 minutes.

When the metal had completely solidified, the article was subjected to radiographic analysis. This analysis showed that the soundness requirements for thin-walled cast shapes were met by the cast product.

Figure 3:
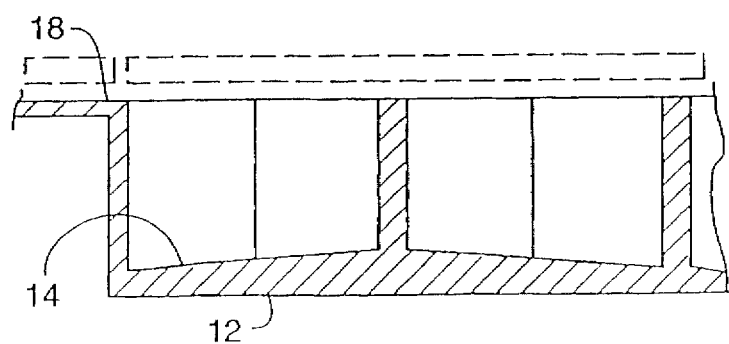
FIG. 3 is a metal casting according to the present invention along line 3—3 of FIG. 1 showing that the base may have a non-planar first major surface and that the device may include a recessed region for receiving a cover plate.
Figure 4:
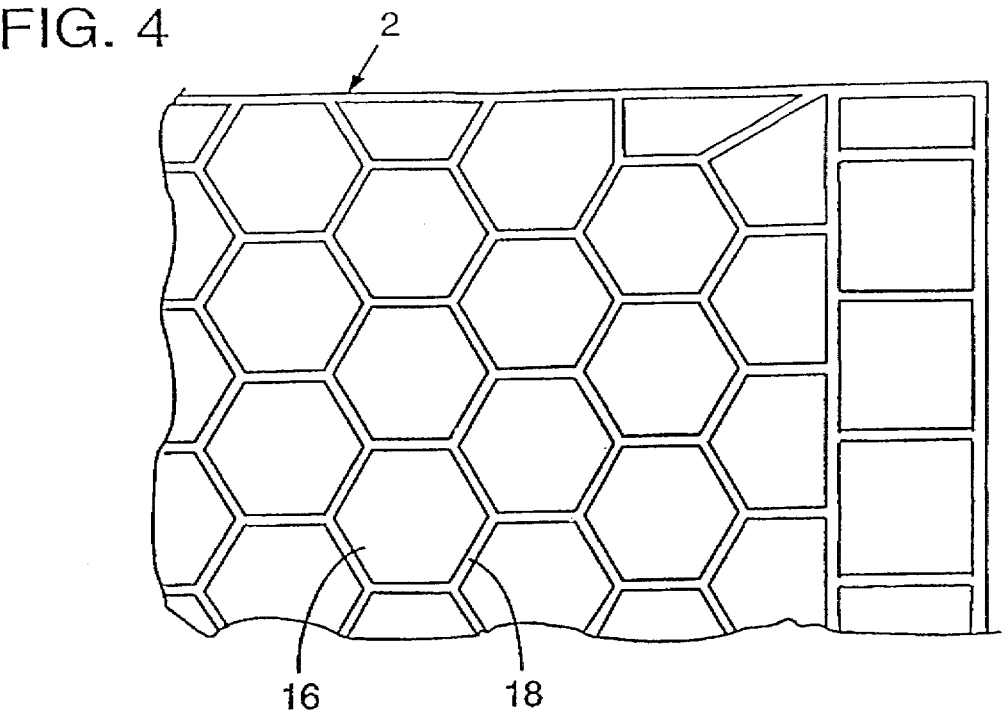
FIG. 4 is a plan view of a metal casting according to the present invention illustrating that various-shaped and interconnected regular and irregular polygons may be used to form the honeycomb structure.

The procedure described in example 1 has been used to make a number of castings. For instance, FIG. 3 shows that the base plate may include non-planar surfaces. The casting illustrated by FIG. 3 also was made using Ni-718. Likewise, a honeycomb structure may be made to include a recess as shown in FIG. 3. This recess may be used to secure a plate to the honeycomb.

D. Conclusion

The present invention relates to a new and improved metal castings, at least a portion of which includes a honeycomb structure. The article is cast in a mold cavity having a configuration corresponding to the configuration of the article. The mold cavity is produced by forming a mold around a pattern that was produced by stereolithiography, or other suitable methods. The mold is preheated so that a lower half of the article mold is cast at a temperature which is close to but less than the solidus temperature of the metal of the article. The upper half of the mold is heated to a temperature which is close to the liquidus temperature of the metal. Molten metal is conducted into the article mold cavity through an inlet from a gate or runner at the upper end of the article mold cavity and is solidified in a honeycomb structure with an equiaxed grain structure.

Having illustrated and described the principles of the invention in several preferred embodiments, it should be apparent to those skilled in the art that the invention can be modified in arrangement and detail without departing from such principles. We claim all modifications coming within the spirit and scope of the following claims.

We claim:

1. A metal investment casting of a high-temperature superalloy, the casting comprising:

a base having a thickness of 5 mm or less; and plural walls integral with the base, the walls having a substantially uniform thickness and forming a honeycomb structure, the walls projecting outwardly in a first direction from at least a portion of the base, the honeycomb structure being open opposite to the base, the plural walls having a thickness of from about 0.3 mm to about 3.2 mm.

2. The casting according to claim 1 wherein the base has a thickness of about 4 mm or less.

3. The casting according to claim 1 wherein the plural walls define at least a section of the honeycomb structure having regular polygons.

4. The casting according to claim 1 wherein the plural walls define at least a section of the honeycomb structure having irregular polygons.

5. The casting according to claim 3 wherein the maximum cross-sectional distance between opposed walls of the regular polygons and extending between the centers of the polygons is about 40 mm.

6. The casting according to claim 3 in which the plural walls define plural hexagonal cells which together form at least a section of the honeycomb structure.

7. The casting according to claim 6 in which the distance between opposed walls of each hexagonal cell, taken along a line bisecting the opposed walls of the cell and intersecting the center of the cell, is from about 5 mm to about 40 mm.

8. The casting according to claim 6 in which the distance between opposed walls of each hexagonal cell, taken along a line bisecting the opposed walls of the cell and intersecting the center of the cell, is about 5 mm to about 20 mm.

9. The casting according to claim 8 in which the walls are from about 0.7 mm to about 2.0 mm thick.

10. The casting according to claim 9 in which the walls are from about 0.8 mm to about 2.0 mm thick.

11. A metal investment casting of a high-temperature superalloy, the casting comprising:

a base having a first major surface and a thickness of 4 mm or less; and plural walls integral with the base and having a substantially uniform wall thickness and projecting outwardly from the first major surface of the base greater than about 1 mm to about 20 mm, the walls being interconnected to form a cellular structure which includes a multiplicity of cells of a regular or irregular polygonal shape, the distance between opposed walls of each cell, taken along a diameter of a circle located inside the polygon and touching the walls of the polygon, is from about 5 mm to about 40 mm, and wherein the thickness of the cell walls is from about 0.3 mm to about 3.2 mm thick.

12. The casting according to claim 11 in which the diameter is from about 5 mm to about 20 mm, and the thickness of the cell walls is from about 0.8 mm to about 2.0 mm thick.

* * * * *